May 8, 1951 J. ZICHIS 2,552,360
METHOD OF AND APPARATUS FOR DEHYDRATING MATERIALS
Filed Jan. 10, 1945 4 Sheets-Sheet 3
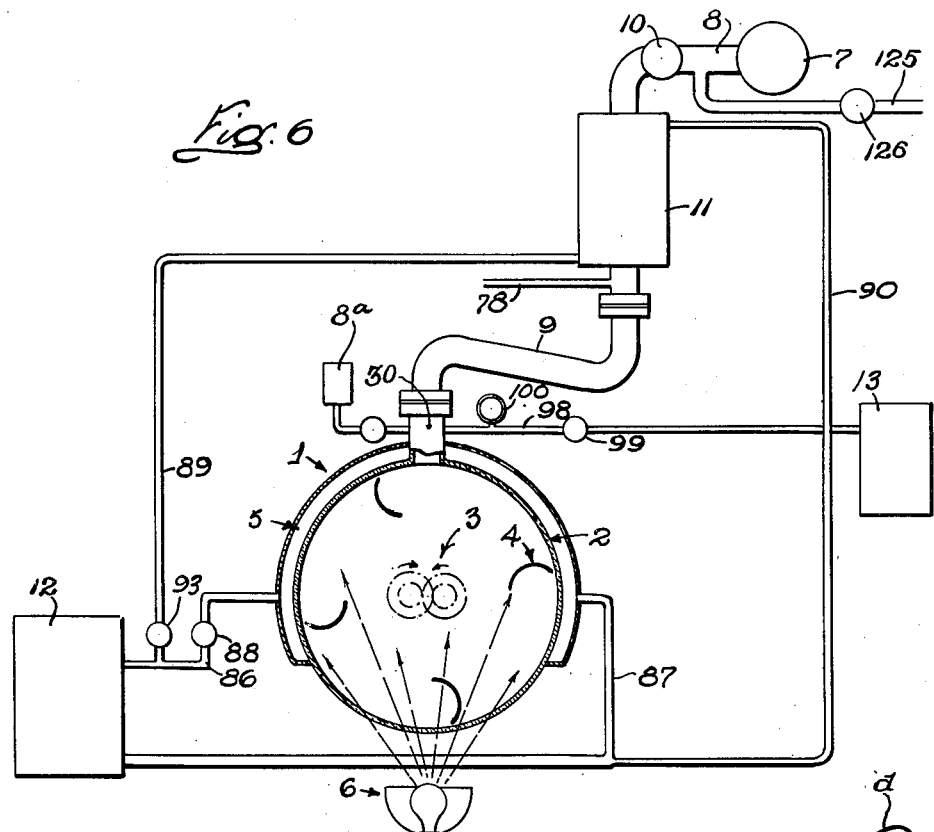

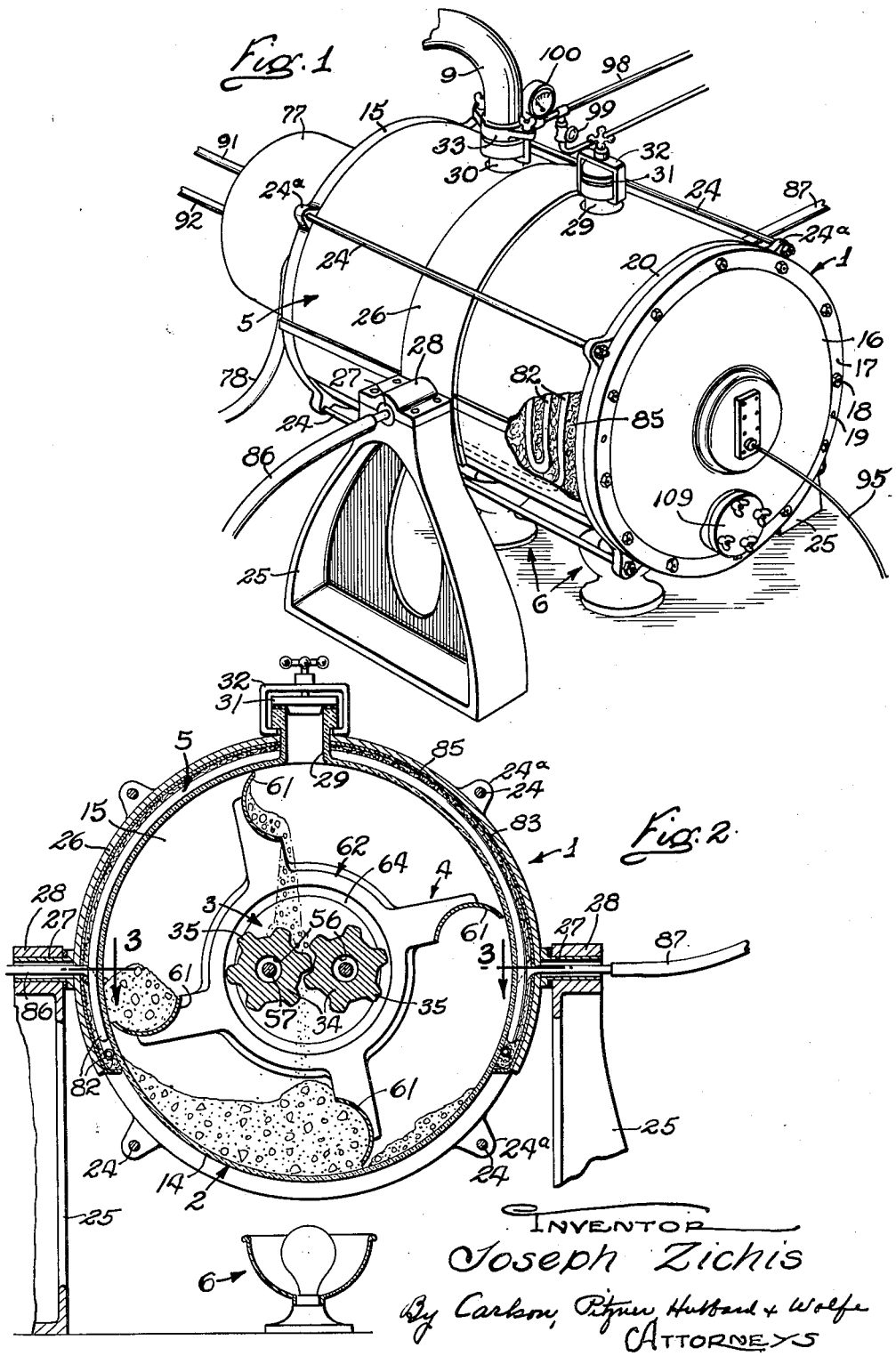

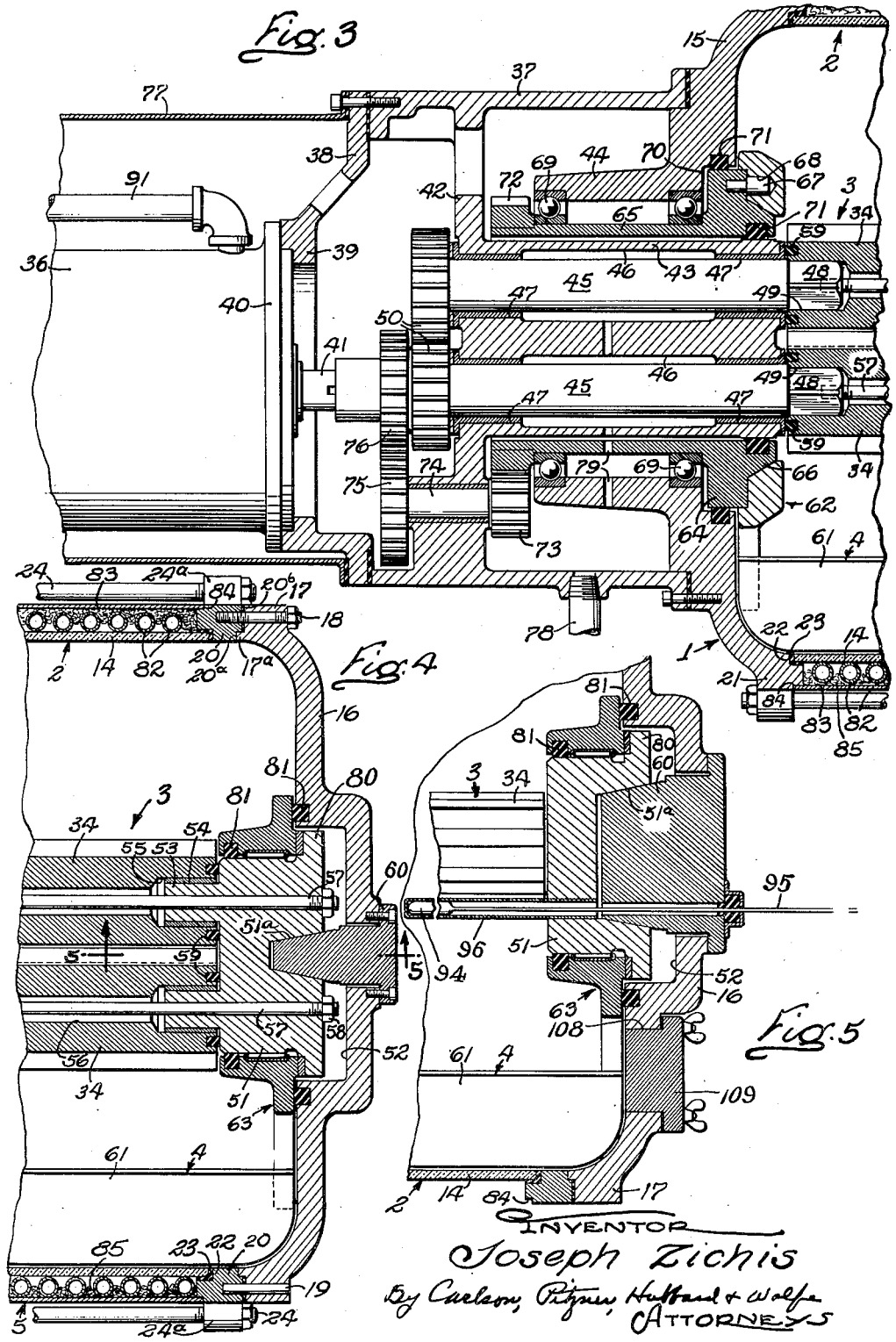

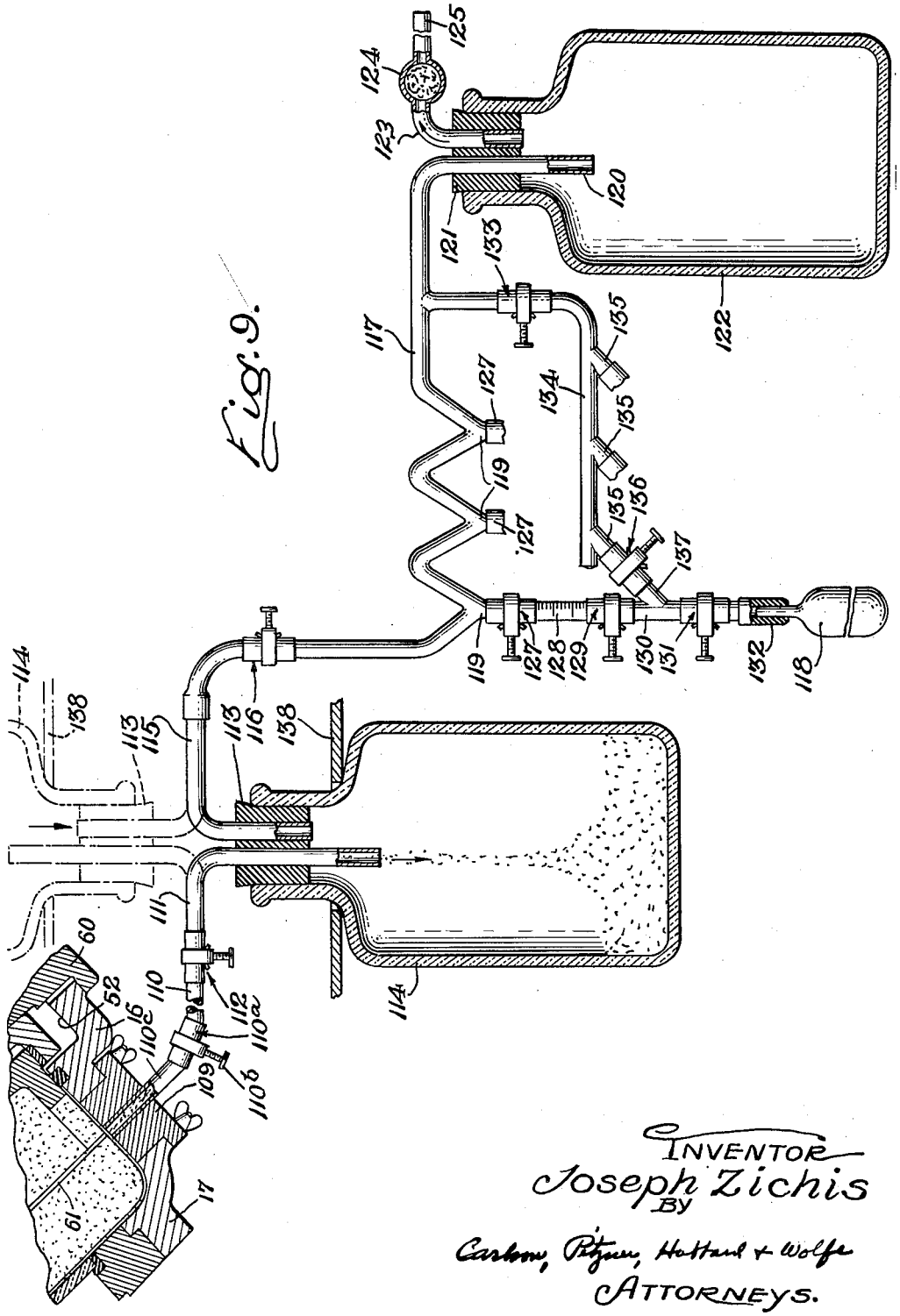

Patented May 8, 1951

2,552,360

UNITED STATES PATENT OFFICE 2,552,360

METHOD OF AND APPARATUS FOR DEHYDRATING MATERIALS

Joseph Zichis, Chicago, Ill.

Application January 10, 1945, Serial No. 572,211

6 Claims. (Cl. 241—23)

The present invention relates generally to the art of producing dehydrated materials, and has particular reference to a new and improved method of and apparatus for dehydrating materials to reduce their bulk and increase their keeping qualities.

The invention is of advtantage especially for drying materials, such for example as certain food products, therapeutic preparations and biological products, which tend to deteriorate very quickly in their natural state and are difficult to dehydrate except by sublimation without denaturation. Such food products include fruits, fruit juices, vegetables, infant's food, and milk. Blood plasma, sera, vaccines, glandular and other tissue extracts, natural and synthetic drugs, antibiotics, peptones and bacteriological media are examples of such therapeutic preparations and biological products. Under the present invention, these and other like materials are dehydrated under vacuum by sublimation from a finely divided frozen state so as to retain and preserve their natural qualities.

One of the objects of the present invention is to provide a novel method of dehydrating material without denaturation and at a rapid rate of speed.

Another object is to provide a new and improved method of dehydrating material by sublimation from the frozen state by subjecting the material to a vacuum while it is frozen and in a finely divided or comminuted condition, thus presenting a large surface area for evaporation, and facilitating quick, uniform and thorough drying of the particles.

A further object is to provide a novel method of the foregoing character in which the frozen comminuted particles of the material, while subjected to the action of drying under vacuum, are maintained in a dispersed or suspended state inside the drying chamber.

Another and more specific object is to provide a new and improved method of the foregoing character in which the frozen material is first elevated and then permitted to drop by gravity in a continuous circulatory action to prevent the particles from adhering to the walls of the vacuum chamber and in which the falling material is subjected repeatedly to a crushing or regrinding action to prevent it from congealing into solid masses.

A general object is to provide a novel method of originally dehydrating a natural material by sublimation from the frozen state by which a final product is obtained that is in powdered form and, therefore, does not require subsequent regrinding and redehydration.

Another object is to provide a novel apparatus for carrying out the foregoing method.

Other objects and advantages will become apparent as the description proceeds.

In the accompanying drawings:

Figure 1 is a fragmentary perspective view of a dehydrating apparatus embodying the features of my invention.

Fig. 2 is a fragmentary transverse vertical sectional view of the apparatus.

Fig. 3 is a fragmentary horizontal sectional view taken substantially along line 3—3 of Fig. 2, and illustrating the drive end of the apparatus.

Fig. 4 is a fragmentary horizontal sectional view taken in the same plane as Fig. 3, but illustrating the opposite end of the apparatus.

Fig. 5 is a fragmentary sectional view taken along line 5—5 of Fig. 4.

Fig. 6 is a diagrammatic representation of a dehydrating system operable in accordance with my invention.

Fig. 7 is a representative temperature curve.

Fig. 8 is a transverse vertical sectional view similar to Fig. 2, but of a modified form of apparatus.

Fig. 9 is a view of apparatus for filling the dehydrated material from the vacuum chamber into individual market containers.

Referring more particularly to the drawings, the invention, in its broader aspects, may comprise any suitable apparatus for subjecting the material to be dried, while in a comminuted or finely divided form and substantially dispersed phase, to desiccation by sublimation under vacuum from a frozen state. In practice, the material may be supplied and handled in any suitable manner as, for example, in a batch operation.

The apparatus, which constitutes the exemplary or preferred embodiment of the invention, generally comprises an operating system (see Fig. 6) including as the primary element a drying unit or dehydrator 1 into which the material to be treated is introduced. This drying unit comprises a closed receptacle or container 2 of proper size, shape and structure which encloses crushing means 3 for comminuting the material if introduced in the liquid state and subsequently frozen therein, and for maintaining the material in comminuted or finely divided form, and which also encloses agitating means 4 for raising the material in dispersed suspension and directing it in a continuous cycle to the crushing means. The container 2 is further provided or associated with cooling means 5 for refrigerating the material, and suitable heating means 6 for supplying heat energy to the material, under selective control.

The operating system additionally includes suitable means for inducing and maintaining a predetermined vacuum in the container 2, and this means may comprise a vacuum pump 7 having a suction pipe 8 adapted to be connected through a flexible conduit 9 to the dehydrating chamber. Interposed in the pipe 8 is a shut-off valve 10 and a condenser 11 for precipitating the entrained vapor extracted from the material under treatment. The condenser 11 and the cooling means 5 for the container 2 are supplied with a suitable cooling medium from a refrigerator 12. Suitable means, including a steam generator 12, is also provided for sterilizing the apparatus.

The method, constituting the present invention, may be used for dehydrating a large range of materials having residual solid ingredients either in a moist, liquid or frozen state, but is particularly useful for, and hence described as applied to, the drying in the frozen state of certain materials, which are ordinarily difficult to reduce to the dry state without suffering denaturation or deterioration. The purpose of the method is to dehydrate these materials speedily and without the loss of natural qualities. In the case of dried food products, such as enumerated above, upon the addition of water, they go into solution or suspension readily, and their original flavor and quality are retained. In the case of therapeutic preparations and biological products, such as previously enumerated, the dried material is preserved for a long period of time without loss in potency or efficacy.

In carrying out the method, the dehydrating chamber 2 first is suitably cleaned and sterilized. This may be accomplished in any conventional manner, as for example by supplying steam from the generator 13 at a pressure of about twenty pounds per square inch for a period of thirty minutes.

The dehydrating chamber 2 now is cooled down to 0° C. or below. At this point, the method may be varied depending on whether the material must be retained absolutely free of micro-organisms or not. For example, if therapeutic preparations, which must remain aseptic, are to be treated, the chamber 2 is cooled to approximately 0° C. and then the material is introduced as a liquid. On the other hand, products that need not be kept sterile, such as food products and certain drugs, may be introduced into the chamber 2 either as a liquid or as finely crushed ice. In the latter instance, the chamber 2 preferably is precooled to −5 to −10° C.

The amount of material introduced in each batch is not closely critical, but depends in part on the physical limitations of the apparatus. An amount corresponding substantially up to fifty percent (50%) of the internal volume of the chamber 2 can be handled satisfactorily.

After the chamber 2 has been precooled, charged and sealed, the material, whether introduced as a liquid or in the form of comminuted frozen particles, is continuously stirred by the agitating means 4. If the material is introduced as a liquid, the chamber 2 is further cooled to approximately −5 to −10° C. to bring the liquid to the freezing point, and as a result of the agitation and crushing, the material while freezing will be transformed into a finely divided state. The exact temperature is not critical, it being important only that the material be completely frozen and retained in the frozen state during the critical period of dehydration.

During and after freezing, the material, in the course of agitation, is also subjected to a crushing and recrushing action by the crushing means 3. The agitating means 4 serves to maintain the finely divided material in a state of suspension within the chamber specifically by elevating it and then permitting it to drop by gravity, and also to direct the falling material in a continuous cycle to the crushing means 3. Thus, the material is subsequently dehydrated from a comminuted frozen state, and in a dispersed or suspended condition, which presents a large surface area for evaporation and exposes the individual particles effectively to the drying action.

As soon as the material is frozen and under the agitating and crushing action, it is subjected to a suitable drying vacuum. This is accomplished in the present instance by connecting the container 2 through the condenser 11 to the vacuum pump 7. The degree of vacuum will depend on the characteristics of the material to be dried, and in most instances may be within a range of from 400 to 50 microns of mercury according to the McLeod or similar gauge $8^a$, with 50 microns as the preferred value.

As soon as the vacuum is increased sufficiently to dry the material, for example to approximately 200 microns of mercury, the material is further cooled quickly to a still lower temperature and preferably to a range of approximately −20 to −45° C. Such cooling is effected by the rapid loss of latent heat of evaporation and is assisted by the cooling means 5. The material now is being rapidly dehydrated by sublimation. The sharp drop in temperature of the material from the liquid state to the depressed temperature is indicated by the line $a$—$b$ of the illustrative curve in Fig. 7.

When the temperature has dropped to the desired extent, i. e., to a predetermined point within the range of from −20 to −45° C., external cooling is discontinued by cutting of the refrigerator 12, and heat is applied to the material by the heating means 6 so as to hasten final drying. As shown in Fig. 7, the temperature remains substantially constant from $b$ to $c$, and it is during this period that most of the drying is effected. The temperature then rises rapidly from $c$ to $d$ to above the freezing point. Since most of the moisture has been removed, the temperature can be elevated as high as 45° C., or even higher without causing denaturation of the product. After the material has been maintained at the elevated temperature for the desired period, the heating means 6 is disconnected, and drying is continued without the application of external heat. At this time, the temperature drops from $d$ to $e$, which is room temperature, and remains constant. The material is now fully dehydrated and may be removed from the container 2.

The vapor extracted from the material by the vacuum may be condensed by any suitable means, and in the present instance is removed by freezing in the condenser 10.

It will be understood that the material is continuously agitated and crushed throughout the period of dehydration. As stated, the comminution of the material provides an enormously increased surface area, and reduces the material to small particles which can be thoroughly acted upon by the applied energy. The suspension of the material in the atmosphere of the drying chamber insures that all sides of the individual particles are regularly and uniformly exposed to the drying action. As a result, the material is dehydrated most effectively and much more rapidly than is possible by prior methods.

The continuous crushing and recrushing of the material throughout the critical period of dehydration is important not only in that conglomeration of the particles is thereby prevented during the drying action, but also because the resulting product is in pulverant form and ready for the market. In this connection, it is desirable that the product as marketed be finely divided in order to dissolve more quickly and easily. Therefore, some products obtained by prior methods of dehydration, which though friable are in a conglomerate mass after initial dehydration, commonly are subsequently ground or reduced to a powder. Such subsequent treatment is objectionable because of the increased time and expense that is involved, and also because most dried products are hygroscopic and will take up moisture from the atmosphere during subsequent grinding, and thus necessitate redehydration. The regrinding and attendant absorption of moisture and the redehydration are likely to result in denaturation and contamination of the product, and consequently are not permissible in instances where asepsis is essential. It will be evident that the foregoing difficulties are avoided in the practice of the present method, since the material is kept in a finely divided state in the original drying chamber, and when completely dried can be transferred aseptically to the final containers.

Considering now the preferred form of apparatus shown in the drawings, the container 2 preferably comprises a cylindrical shell 14 closed at opposite ends by removable circular heads or cover plates 15 and 16. One of these plates, for example the plate 16, is formed at the outer periphery with a circular mounting flange 17 removably secured by bolts 18 and dowel pins 19 in concentric relation to an adapter ring 20 of like radial dimensions. The outer face of the ring 20 is formed with an annular notch 20ª at the inner periphery to interfit with an annular rib or tongue 17ª on the adjacent face of the flange 17, and a gasket 20ᵇ is interposed between the parts about the tongue, whereby to obtain a smooth joint and a hermetically tight seal.

The other cover plate 15 similarly is formed at the periphery with a circular flange 21 in spaced opposed relation to the ring 20. Both the ring 20 and the flange 21 are formed in their inner or adjacent faces at the inner periphery with annular notches 22 in which the opposite ends of the cylindrical sleeve or shell 14 are seated against rubber gaskets 23 to form a smooth joint and tight seal. A plurality of tie rods 24 extending respectively through alined ears 24ª on the outer peripheries of the cover plate 15 and ring 20 serve to secure these parts and the cylindrical shell 14 rigidly in assembled relation to provide the completed container 2.

The cover plates 15 and 16 are generally flat, but with the respective flanges 17 and 21 offset inwardly to define a slightly hollow or dished shape. In each instance, the inner surface is curved smoothly from the flat center portion into a cylindrical surface flush with the inner surfaces of the shell 14 and the ring 20 so that the corners of the container are rounded and no sharp edges are presented. Since all of the joints of the sections are flush and closely fitted, the internal surface of the container is smooth throughout the entire area exposed to the material under treatment so as to prevent or minimize the collection or adherence of frozen particles of the material, and to facilitate emptying and cleaning of the chamber.

While the container 2 may be supported in any desired position, it is preferably mounted between bearing standards 25 for pivotal adjustment either into a normal horizontal operating position or a generally vertical or inclined position for unloading. More particularly, a band 26 is secured about the dehydrator 1 substantially midway of the ends, and is provided with trunnions 27 supported in bearings 28 on the upper ends of the standards 25.

The upper side of the cylindrical shell 14 of the container 2 is formed with two ducts 29 and 30 flanged at their outer ends and providing openings to the interior. One of these ducts, for example the duct 29, may be conveniently used for introducing the material to be dried either in liquid or comminuted frozen form, and is adapted to be tightly sealed by a cover plate 31 secured against the end flange by a suitable clamp 32 when the container is charged. The other duct 30 constitutes a fitting adapted for connection by a clamp 33 to the suction end of the flexible conduit 9 through which a high vacuum may be induced when the cover plate 16 is in place and the supply duct 29 is sealed. It will be understood that the flexible conduit 9 permits the dehydrator to be angularly adjusted so as to facilitate discharge of the dried material. Preferably, the conduit 9 normally is arranged with the suction end above a portion of its length, as shown in Fig. 6, to provide a trap for preventing foreign matter from dropping or flowing therethrough into the container 2.

The crushing means 3 within the container 2 may be of any suitable type effective to cause the material to freeze in a finely divided state if initially introduced as a liquid, and to maintain the material in such state throughout the drying operation whether initially introduced as a prefrozen comminuted charge or refrigerated to below the freezing point in the container after charging. In the present instance, the crushing means 3 comprises two parallel rollers 34 extending in cooperative relation in a substantially horizontal plane longitudinally through the center of the container 2, and rotatably supported at opposite ends by the cover plates 15 and 16. Preferably, the rollers 34 are formed with long teeth 35 coextensive in length therewith which are in intermeshing relation, with ample clearance to permit the passage of the material when crushed to a predetermined degree of fineness to pass downwardly therebetween. In effect, the members 34 may be said to constitute long corrugated rollers or gears in loose meshing engagement.

The rollers 34 are adapted to be driven positively by suitable power means to rotate, with the teeth 35 at the top moving toward each other into meshing engagement to trap and crush the material, and the teeth at the bottom moving apart to spill the crushed material into the bottom of the container 2. Preferably, the power means is mounted on the cover plate 15, and comprises an electric motor 36 connected through a gear drive to both rollers 34. More particularly, a cylindrical gear housing 37 is bolted at one end to the cover plate 15, and is closed at the other end by a cover plate 38 removably bolted in position and formed with a flanged mounting ring 39. The motor 36 has a mounting flange 40 centered in and removably bolted to the ring 39, and has a built-in gear reduction connected to a drive shaft 41 extending axially through the ring into the gear housing 37.

The gear housing 37 is formed internally with an integral transverse web or wall 42 having a tubular bearing member 43 extending in coaxial and peripherally spaced relation through a central annular bearing sleeve 44 on the cover plate 15. Two parallel drive shafts 45 extend through longitudinal bores 46 in the bearing member 43 into one end of the container 2 for separable drive connection with the adjacent ends of the crushing rollers 34. The shafts 45 are suitably journaled in flanged sleeve bearings 47 inserted in opposite ends of the bores 46, and at their inner ends are provided with square keys 48 engaging in complemental sockets 49 in the ends of the rollers 34. The outer ends of the shafts 45 are connected by meshing gears 50, and one of the shafts has an axially separable drive connection with the motor shaft 41. Consequently, both rollers 34 are driven from the motor 36 at the same speed but in opposite directions.

The opposite ends of the crushing rollers 34 are journaled on a circular bearing block 51 supported in centered position within a recess 52 formed in the removable cover plate 16. Specifically, the block 51 is formed on its inner face with two cylindrical stud bearings 53 which extend for axial separation into bearing sleeve liners 54 in suitable bores 55 in the adjacent ends of the rollers 34.

To secure the rollers 34, drive shafts 45, and bearing block 51 in assembled relation, the rollers are formed with axial bores 56, and tie rods 57 are extended therethrough into threaded engagement with tapped holes in the ends of the drive keys 48. The rods 57 are also extended through the block 51, and have nuts 58 on the outer ends. Suitable annular rubber seals 59 are inserted in grooves in the ends of the rollers 34, and project therefrom for yieldable engagement respectively with the inner sleeve bearings 47 and the block 51 so as to avoid metal-to-metal contact and to prevent the material under treatment from working into the supporting bearings and the drive sockets. By adjusting the nuts 58, the seals 59 at both ends of the rollers 34 may be properly tensioned.

To provide suitable means for centering the rollers 34 when the cover plate 16 is in position, the bearing block 51 is formed in the outer face with a diametrical groove 51ª with tapered sides and ends, and a central wedge key 60 is secured to the cover plate within the recess 52 to engage in the groove.

The agitating means 4 comprises a plurality of peripherally spaced scraper blades 61 interfitting closely with, but spaced slightly from, the inner surfaces of the container 2, and are revoluble as a paddle wheel to prevent adherence of the material to the surfaces, to elevate the material from the bottom of the container and then permit it to drop by gravity so as to maintain the material in a dispersed and partially suspended state, and to direct the material recurrently to the crushing rollers 34. In the preferred form, the blades 61 extend longitudinally through the container 2, are smoothly curved transversely, and are rigidly secured at opposite ends respectively to the radial arms of two spiders 62 and 63. The blades and spiders constitute a paddle wheel axially confined between the cover plates 15 and 16, and suitably connected to the motor 36 for rotation about and in timed relation to the crushing rollers 34.

The spider 62 has a base ring interfitting with a flange 64 on the inner end of a drive sleeve 65, and centered thereon through internal wedge engagement with a conical pilot extension 66. A plurality of drive pins 67 anchored in the flange 64 project into sockets 68 in the base ring to connect the parts for joint rotation.

The drive sleeve 65 extends through the bearing sleeve 44 on the cover plate 15 in concentrically spaced relation about the bearing block 43, and is rotatably supported in the sleeve by axially spaced ball bearings 69. The flange 64 is disposed in a counterbore 70 formed in the inner face of the plate 15. Suitable annular rubber seals 71 are provided at the inner and outer peripheries of the flange 64 to prevent the material under treatment from working outwardly into the clearances between the block 43 and sleeves 44 and 65.

Secured to the outer end of the drive sleeve 65 is a ring gear 72 meshing with a pinion 73 on a stub shaft 74 journaled in the wall 42. The shaft 74 is connected through gears 75 and 76 to the shaft 41 to complete the drive connection.

In order to prevent the entry of air or oil from the housing 37 into the container 2, both sides of all of the bearings are subjected to the same pressure. To this end, the motor 36 is enclosed in a sealed housing 77 tightly bolted to the cover plate 38, and the interior of the gear housing 37 is connected through a pipe 78 to the vacuum pump 7. Also, the bores 46 are enlarged between the sleeve bearings 47, and, together with the interior of the sleeve 65 and the space between the bearings 69, are vented through passages 79 to the interior of the gear housing 37.

The other spider 63 has a base ring rotatably supported on the bearing block 51. A flange 80 on the outer end of the block 51 serves to hold the paddle wheel in assembled relation with the crushing rollers 34, and the spider 62 in centered and separable driving engagement with the flange 64. Suitable annular rubber seals 81 are provided to prevent the material in the container 2 from working out past the spider 63.

It will be noted that by reason of the various seals, metal-to-metal contact in the container is avoided. The container 2 and the various parts exposed therein may be made of any suitable material substantially non-corrosive by such acids or alkalies as are likely to be found in the material to be processed. In the form of Figs. 1 to 5, the cylindrical sleeve 14 is made of glass having a low coefficient of expansion, and the remaining parts preferably are made of stainless steel.

The cooling means 5 for refrigerating the container 2 may be of any suitable type, and in the present instance is shown as comprising a plurality of pipe coils 82 disposed about and contiguous to the upper portion of the cylindrical shell 14. An outer concentric shell 83 interfits at opposite ends with peripheral notches 84 in the rings 20 and flange 21 to enclose the coils 82. Preferably, a suitable insulating material 85 is packed between the coils 82 and the shell 83. The opposite ends of the coils 82 extend axially through the trunnions 27, and are connected through inlet and discharge pipes 86 and 87 to the refrigerator unit 12. A regulating valve 88 is interposed in the pipe 86 to control the supply of refrigerant. It will be understood that when the valve 88 is open, the refrigerant or cooling medium is circulated continuously through the coils 82.

Branch pipes 89 and 90 lead respectively to the inlet and outlet of the condenser 10, and other branch pipes 91 and 92 are connected to circulate the cooling medium through the motor 36. A regulating valve 93 is interposed in the line 89 to control the circulation of cooling medium through the condenser 11.

To provide for heating the container 2, the lower portion of the glass sleeve 14 is left exposed in position over the heating means 6. In the present instance, the heating means comprises a plurality of infrared lamps. It will be understood that the light from these lamps passes through the wall of the container, and upon contacting the material under treatment imparts heat thereto. The rays from the infrared lamps impart radiant heat directly to the material, and have a high penetrating capacity, thus resulting in quick and effective final drying.

Any suitable means may be employed for measuring and indicating the temperature in the dehydrator 1 throughout the operation, and in the present instance this means is shown as a thermostat 94 having a lead 95 adapted to be connected to a recording thermometer (not shown). The thermostat 94 is enclosed in a tube 96 of heat conducting material supported at one end in the block 51, and projecting therefrom in parallel relation to and immediately below the crushing rolls 34 for direct contact with the crushed material as it falls to the bottom of the chamber 2.

The steam generator 13 is adapted to be connected to the suction duct 30 through a branched pipe 98 having an individual regulating valve 99. A suitable pressure gauge 100 connected to the pipe 98 serves to indicate the steam pressure in the container 2 when the valve 99 is open.

A modified form of dehydrator 1ª is shown in Fig. 8. This form is provided with different cooling means 5ª and heating means 6ª, and in other respects is the same as the first form, with like parts identified by the same reference numerals plus the letter *a*.

The cooling means 5ª comprises a jacket 83ª which encircles the top and sides of the container 2ª to a horizontal plane slightly below that of the trunnions 27ª, and which is filled with a liquid cooling medium. In this instance, the cooling medium is admitted from the refrigerator line 86 through an inlet pipe 101 discharging to the upper portion of the cooling space within the jacket 83ª, and returned to the line 87 through an outlet pipe 102 opening from the lower portion of the space.

The heating means 6ª comprises a second jacket 103 which encircles the lower portion of the container 2ª up to the cooling jacket 83ª, and which is adapted to receive a suitable heating medium. In the present instance, the jacket 103 is filled with a liquid bath, and electric immersion heating elements 104 extend therethrough. Also extending into the heating jacket 103 is a thermostat 105. Since light is not employed for heating purposes, the container 2 may be made of stainless steel or other suitable metal, rather than of glass. An outer shell 106 completely encloses and is concentrically spaced from the cooling and heating jackets 83ª and 103, and the intervening space is filled with a suitable insulating material 107.

To provide means for permitting the removal of the dry powdered material from the dehydrator 1, the end plate 16 is formed adjacent the lower edge with a discharge opening 108 normally closed by a removable plug 109. For removing the material by gravity, the plug 109 may consists of a simple closure as illustrated in Fig. 5. To empty the dehydrator 1 with such closure, it is tilted into a generally vertical position with the end plate 16 lowermost, and the plug 109 is removed. Before opening the discharge opening 108, the vacuum in the container 2 may be destroyed by introducing a suitable gas such as nitrogen. Thereupon, the material will collect in the lower end, and fall through the opening.

The apparatus may also be adapted for filling the dried powder from the dehydrator 1 under vacuum directly into final market containers. This is particularly advantageous in substances where the powder must be handled aseptically, or where it is hygroscopic. One form of such arrangement is illustrated in Fig. 9. In this arrangement, an outlet tube 110 is adapted to be connected at one end by a rubber tube 110ª with a clamp 110ᵇ to a tube 110ᶜ inserted through a central opening in the plug 109 in position to receive the powder when the dehydrator 1 is slightly inclined. When the tube 110 is removed, the clamp 110ᵇ is utilized to close the tube 110ª and thus seal the outlet from the chamber 2. The outer end of the tube 110 is joined to a bent tube 111 by a rubber connection 112 with a clamp adapted to close the passage therethrough. The bent end of the tube 111 extends through a rubber stopper 113 a substantial distance into a collecting bottle 114 which may be made of any suitable material, such as heavy glass, and which is adapted to be filled with the dried powder material. A second bent tube 115 extends at one end through the stopper 113 into the bottle 114, and terminates just inside the stopper short of the tube 111. The outer end of the tube 115 is joined by a rubber connection 116, with a clamp, to one end of a vacuum manifold 117.

The manifold 117 may be of any suitable character having one or a plurality of nipples constituting outlet openings for attachment respectively to a like number of vials or containers 118. In the present instance, three nipples 119 are shown, but it is to be understood that a much larger number may be provided if desired. The nipples 119 open in parallel from the manifold 117, and preferably the latter is of zigzag form, with each nipple located at the lower juncture of two upwardly diverging tube sections. As a result of this construction, the material entering each approaching section tends to fall by gravity into the associated nipple, and to be constrained by the opposite section of each bend from passing along the manifold under the influence of suction to a succeeding nipple until this nipple is filled.

The suction end of the manifold 117 terminates in a bent tube 120 which extends through a rubber stopper 121 into a bottle 122 which may be made of any suitable material, and which serves as a trap for any powdered material that may be carried past the series of nipples 119. Another bent tube 123 extends through the stopper 121, and is connected through a filter 124 to a tube 125 adapted to be connected to a suitable source of vacuum. Preferably, the tube 125 is adapted to be connected by a valve 126 to the suction pipe 8 of the vacuum pump 7.

Each nipple 119 is joined by a rubber connection 127, with a clamp, to one end of a vertical measuring chamber, preferably comprising a graduated glass tube 128. The lower end of the tube 128 is joined by a rubber connection 129, with a clamp, to a short tube 130, and the latter similarly is joined by a rubber connection 131, with a clamp, to a socket 132 adapted to receive the neck of the container 118.

Joined to the downstream end of the manifold 117, beyond the series of nipples 119, by a rubber connection 133, with a clamp, is a branch suction manifold 134 having a series of nipples 135 along its length. The nipples 135 are adapted to be joined respectively through rubber connections 136 with clamps to associated nipples 137 opening to the tubes 130.

The various rubber connections, namely the connections 110a, 112, 116, 127, 129, 132, 133 and 136 with the clamps, constitute valves for controlling the various passages in which they are interposed. Only the connection between one filling nipple and one final container is fully shown, and it is to be understood that similar connections are provided with the other nipples. The vessel 114 may be upright, as shown in full outline, when it is to be filled, or may be inverted and mounted on a suitable support 138, as shown in dotted outline, when the containers 118 are to be filled.

In the operation of the filling apparatus, the parts first are sterilized and dried. Then, the clamps or valves 112, 116, 129, 132, 133 and 136 are opened, and the clamps 131 are closed. Referring to Fig. 6, the valve 10 is closed, and the valve 126 is opened to connect the manifold 117 to the vacuum pump 7. Also, the tube 110 is connected to the drying chamber 2 containing the dehydrated material.

The apparatus is now evacuated to a suitable vacuum, for example 100 microns air pressure, and the dried material is drawn by suction from the chamber 2 into the receptacle 114. Then the clamps 112 and 116 are closed, and the receptacle 114 is inverted. Thereafter, the clamp 116 is opened and the clamps 129 are closed, whereupon the measuring tubes 128 will be filled successively with dried material drawn from the receptacle 114. When the tubes 128 are filled to the desired measurements, the clamp 116 and clamps 127 are closed, and the sterile vials or containers 118 are connected to the respective sockets 132. Then, the clamps 131 are opened to evacuate the containers 118 through the branch manifold 134.

After the containers 118 have been evacuated, the clamps 136 are closed, and the clamps 129 and 131 are opened to fill the desired quantity of powder from the measuring tubes 128 into the final containers. Then the clamps 131 are closed, and the tips of the containers are sealed with flame and removed from the sockets 132.

By the foregoing method of filling, the powdered material is transferred from the dehydrator 1 aseptically under vacuum and in measured quantities to the final sealed containers. The transfer is effected without exposure to the external atmosphere, and hence contamination and the absorption of moisture is entirely avoided.

I claim as my invention:

1. The method of dehydrating moist or liquid material which comprises freezing the material and subjecting the freezing material simultaneously to a crushing action within a drying chamber whereby to provide the material in a comminuted frozen state, continuously subjecting the frozen material in a state of circulation to the crushing action, continuously dispersing the material in said chamber, subjecting the material to the action of a drying vacuum whereby to remove the frozen moisture by sublimation, and finally heating the material to a temperature above freezing to complete dehydration.

2. The method of dehydrating moist or liquid material which comprises freezing the material and subjecting the freezing material simultaneously to a crushing action within a drying chamber whereby to provide the material in a comminuted frozen state, continuously subjecting the frozen material in a state of circulation to the crushing action, continuously dispersing the material in said chamber, and subjecting the material to the action of a drying vacuum whereby to remove the frozen moisture by sublimation.

3. A dehydrating apparatus comprising, in combination, a chamber having a peripheral wall and opposed end walls, two parallel rollers rotatably supported at opposite ends in said end walls and having longitudinal elongated teeth in loose intermeshing relationship, axially alined drive shafts journaled in one of said end walls and having axially separable drive connections with the contiguous ends of said rollers within said chamber, a bearing block supported on the other of said end walls and having tubular bearing members separably interfitting with and supporting the opposite ends of said rollers, tie rods for securing said rollers, drive shafts and bearing block in assembled relation, and drive means connected to said shafts to rotate said rollers.

4. A dehydrating apparatus comprising, in combination, a cylindrical chamber having opposite end walls, trunnions supporting said chamber intermediate its ends for pivotal movement selectively into a horizontal position, inclined position or vertical position, the upper portion of said chamber being formed with a charging duct and with a suction duct adapted for connection to a source of vacuum, a discharge opening in one of said end walls adjacent the lower portion of said chamber, refrigerating means encircling the upper portion of said chamber for cooling the latter, conduits extending through said trunnions for circulating a cooling medium to and from said refrigerating means, and heating means encircling the lower portion of said container.

5. A dehydrating apparatus comprising, in combination, a cylindrical chamber having opposite end walls, trunnions supporting said chamber intermediate its ends for pivotal movement selectively into a horizontal position, inclined position or vertical position, said chamber being formed in the upper portion with a charging duct and with a suction duct adapted for connection to a source of vacuum, a discharge opening in a lower portion of said chamber, refrigerating means encircling said chamber for cooling the latter, and conduits extending through said trunnions for circulating a cooling medium to and from said refrigerating means.

6. A dehydrating apparatus comprising, in combination, a chamber adapted for connection to a source of vacuum and to contain the material to be dried in powdered form, crushing means in said chamber for maintaining the material in a finely divided state, agitating means in said chamber for dispersing the material in said chamber and directing it in a continuous flow to said crushing means, a closed housing on one end wall of said chamber, a drive motor supported in said housing, means for cooling said motor, and a drive connection supported in said housing between said motor and said crushing means and agitating means for driving said last two mentioned means in timed relation, said housing having an outlet for connecting the interior thereof about said motor and said drive connection to a source of vacuum, whereby to equalize the sub-atmospheric pressure on opposite sides of said one end wall.

JOSEPH ZICHIS.

REFERENCES CITED

The following references are of record in the file of this patent:

UNITED STATES PATENTS

| Number | Name | Date |
|---|---|---|
| Re. 20,969 | Reichel | Jan. 3, 1939 |
| 270,030 | Dudley | Jan. 2, 1883 |
| 287,967 | Schiller | Nov. 6, 1883 |
| 678,862 | Cleveland | July 23, 1901 |
| 957,646 | Boughton | May 10, 1910 |
| 1,672,218 | How | June 25, 1928 |
| 1,970,956 | Elser | Aug. 21, 1934 |
| 1,978,913 | Ricci | Oct. 30, 1934 |
| 1,979,124 | Tival | Oct. 30, 1934 |
| 1,999,666 | Scott | Apr. 30, 1935 |
| 2,076,873 | Arnold | Apr. 13, 1937 |
| 2,132,897 | Gentele | Oct. 11, 1938 |
| 2,144,333 | Hegen | Jan. 17, 1939 |
| 2,156,075 | Alexay | Apr. 25, 1939 |
| 2,170,469 | Carter | Aug. 22, 1939 |
| 2,278,670 | Rauer | Apr. 7, 1942 |
| 2,302,253 | Reichel et al. | Nov. 17, 1942 |
| 2,340,345 | Richeson | Feb. 1, 1944 |
| 2,347,464 | Cuno | Apr. 25, 1944 |
| 2,353,986 | Barr | July 18, 1944 |
| 2,388,917 | Hormel | Nov. 13, 1945 |
| 2,411,152 | Folsom | Nov. 19, 1946 |
| 2,414,940 | Flosdorf | Jan. 28, 1947 |
| 2,435,503 | Levinson et al. | Feb. 3, 1948 |
| 2,445,120 | Levinson et al. | July 13, 1948 |